May 17, 1966  R. W. VERYZER  3,251,430
UNITARY AIR CUSHION SUPPORT AND DRIVE UNIT FOR VEHICLES
Filed March 1, 1962
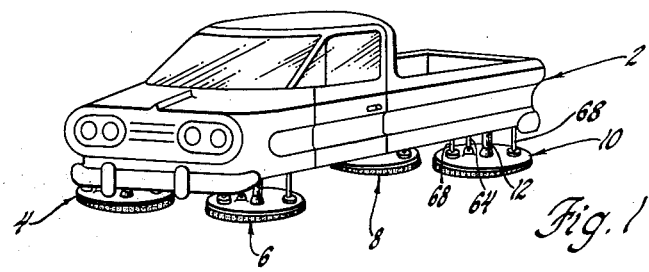
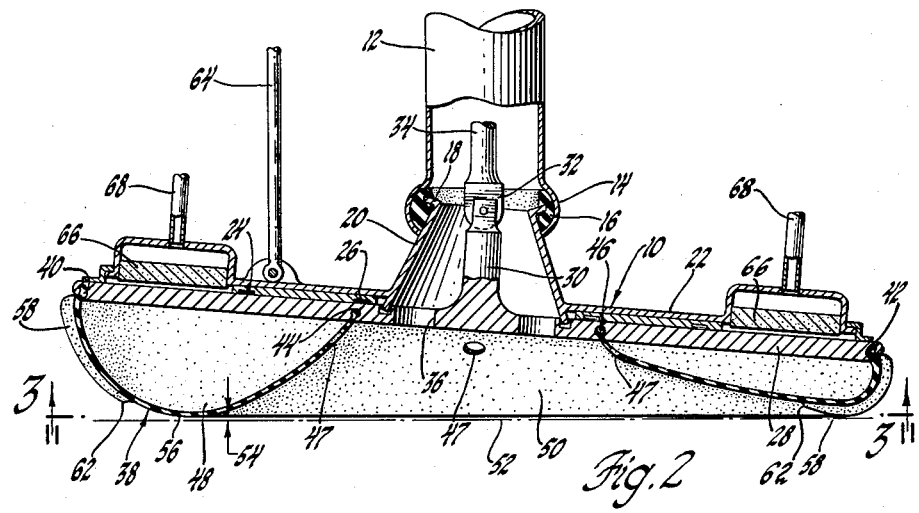
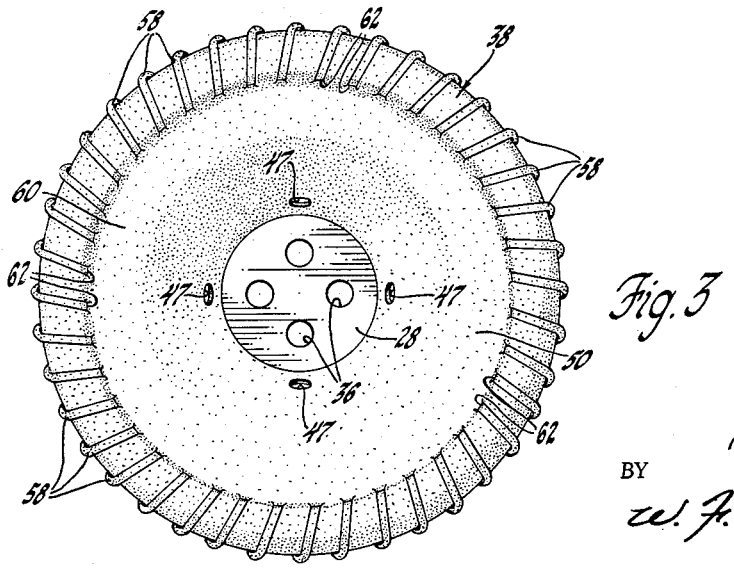
INVENTOR.
Robert W. Veryzer
BY
W. F. Wagner
ATTORNEY

United States Patent Office 3,251,430
Patented May 17, 1966

3,251,430
UNITARY AIR CUSHION SUPPORT AND
DRIVE UNIT FOR VEHICLES
Robert W. Veryzer, Birmingham, Mich., assignor to General Motors Corporation, Detroit, Mich., a corporation of Delaware
Filed Mar. 1, 1962, Ser. No. 176,522
3 Claims. (Cl. 180—7)

This invention relates to vehicle supporting structure and running gear and more particularly to supporting structure and running gear for vehicles intended for off-the-road operation especially on terrain having low capability for supporting high load concentration.

An object of the invention is to provide an improved vehicle supporting structure and running gear.

Another object is to provide a drive unit and supporting structure for a vehicle which permits relatively heavy loads to be moved over spongy or soft terrain.

A further object is to provide a vehicle having a plurality of low pressure air bearing pads mounted thereunder to provide vehicle floatation, the bearing pads being rotatably mounted in a manner permitting angular adjustment of the plane of rotation thereof relative to the horizontal so that portions of the periphery of each pad frictionally engage the ground to produce a propelling tractive force for moving the vehicle over the terrain.

Still another object of the invention is to provide a structure of the stated character in which the air bearing pads comprise rotatable rigid disks having flexible diaphragms secured thereunder in a manner providing an annular cavity between the platform and the diaphragm and a generally frusto-conical plenum cavity between the diaphragm and the ground, the outer periphery of the diaphragm being formed with circumferentially spaced radially directed flexible ribs which taper inwardly to merge with the diaphragm at a predetermined intermediate circumference.

A still further object is to provide an air bearing construction and tractive unit of the type described including drive means for rotating the rigid disk, control means for regulating the angular inclination thereof, and remotely operable brake means for arresting rotational movement of the disk.

These and other objects, advantages, and features of the invention will become more fully apparently as reference is had to the accompanying specification and drawing wherein:

FIGURE 1 is a perspective view of a special purpose vehicle incorporating supporting structure and running gear in accordance with the present invention;

FIGURE 2 is an enlarged sectional front elevational view taken through one of the four running gear and supporting structures; and FIGURE 3 is a view looking in the direction of arrows 3—3 of FIGURE 2.

Referring now to the drawing and particular FIGURE 1, there is illustrated a special purpose vehicle in which the reference numeral 2 generally designates the vehicle body or superstructure. Superstructure 2 is supported relative to the ground by a pair of transversely spaced front supporting and driving units 4 and 6 a pair of transversely spaced rear supporting and driving units 8 and 10. Each driving and supporting unit 4, 6, 8 and 10 is constructed so as to provide low pressure air bearing support for the adjacent corner of the vehicle and the units are mounted on the vehicle in a manner permitting rotation and selective angular inclination thereof causing forward and rearward tractive driving effort as well as steerability.

Inasmuch as each of the supporting and driving units 4, 6, 8 and 10 are identical in construction and operation, the following description with respect to FIGURE 2 will be related to driving unit 10 only, it being understood that the details of construction of units 4, 6 and 8 correspond identically. As seen best in FIGURE 2, unit 10 comprises a vertically extending hollow pillar 12 which forms an integral part of superstructure 2 and depends therefrom. At its lower end, pillar 12 is formed with a radially outwardly bulged mouth 14 of semi-circular cross section in which is mounted a flexible ring 16. Ring 16 in turn engages a radially turned flange 18 formed centrally on the conical neck portion 20 of a circular platform 22 which is movable through a predetermined angular range relative to pillar 12 by flexing of ring 16. Disposed beneath platform 22 in upward abutting engagement with needle thrust bearings 24 and 26 is a rotatable disk 28. Centrally thereof, disk 28 is formed with an integral stub drive axle 30 which extends upwardly in neck portion 20 for connection by means of a conventional Cardan joint 32 with the lower end of a driving axle 34. Driving axle 34 extends upwardly through pillar 12 for driving engagement with the vehicle power transmission train, not shown. It will be understood that axle 34 is intended for driven rotation in either direction by known control means common to power plant and transmission trains of conventional prior art vehicles.

In addition to forming the housing through which driving axle 34 extends, pillar 12 serves as a conduit for low pressure air which is derived from a source of low pressure air, not shown, associated with the vehicle engine, also not shown. Air so derived is discharged downwardly through pillar 12 and neck portion 20 and emerges beneath disk 28 through apertures 36 formed therein at circumferentially spaced intervals around stub axle 30.

In order for the air thus discharged through apertures 36 to provide optimum vehicle floatation in relation to the horsepower expended, disk 28 has disposed thereunder a flexible annular diaphragm 38, the outer peripheral bead 40 of which is clinched in a circumferential slot 42 extending around the entire perimeter of disk 28. The inner peripheral bead 44 of diaphragm 38 in turn is clinched in a circular slot 46 formed in the lower surface of disk 28 concentric with and surrounding the lower extremity of neck portion 20. At circumferentially spaced intervals the portion of diaphragm 38 immediately radially outwardly adjacent the bead 44 is formed with vents or openings 47 which permit communication between the annular cavity 48 defined by diaphragm 38 and disk 28 and the generally frusto-conical plenum cavity 50 defined by diaphragm 38 and the ground surface 52. In the construction just described, air emerging through apertures 36 enters both cavity 48 and plenum 50 causing cavity 48 to inflate and raise the vehicle to a height equal to the degree of inflation, while at the same time a superatmospheric cushion of air trapped in the frusto-conical plenum cavity 50 functions to levitate the vehicle 2. Naturally, air trapped in cavity 50 gradually escapes around the peripheral gap 54 between the ground 52 and the lowermost extremity 56 of diaphragm 38. However, as long as the air loss rate is equaled by the air input rate, the vehicle is supported in substantially friction-free relation to the ground. Furthermore, the entire weight of the vehicle is distributed on the ground over a large area or "footprint" which is four times the total area defined by the base of each plenum cavity 50. Hence, the unit loading on the ground is especially low in comparison with conventional wheeled vehicles and is therefore capable of functioning over terrain on which conventional vehicles would become mired.

According to one feature of the invention, the flexible diaphragm 38 is formed with integral flexible radial ribs 58 which are spaced at intervals around the entire circumference of the diaphragm. Each rib 58 extends from the outer periphery of the diaphragm 38 radially inwardly to a predetermined distance in relation to the circumference defined by the normal clearance gap 54. Thus, for purposes of illustration, the normal clearance gap 54 would lie along the circumference 60 of FIGURE 3 when the disk 28 is in a position parallel with the ground line 52, under which conditions the inboard rib edges 62 would just clear the ground. Under these conditions only levitation would be provided by the air bearing structure. However, upon angular adjustment of platform 22 by rectilinear manipulation of rod 64, as shown in FIGURE 2, by remote control linkage, not shown, the disk 28 and associated diaphragm 38 are caused to assume an angular relation to the ground in which the inboard segment of ribs 58 continues to clear the ground, but the outboard segment of ribs 58 are forced into frictional engagement with that portion of the ground adjacent thereto. Hence, while the air bearing effect of plenum cavity 50 would continue substantially uninterrupted, the individual ribs 58 at the outboard side of the diaphragm provide a degree of positive engagement with the ground which varies according to the angle of inclination of platform 20. Taking the inclination of FIGURE 2 by way of description, it will be evident that upon imparting rotation to disk 28 in the manner previously described, the entire disk and diaphragm structure will be caused to rotate relative to platform 22. Assuming a counterclockwise rotation as viewed from the top of the support structure, it will be seen that support 10 will produce a tractive effort tending to propel the vehicle in a forward direction. Naturally, operation of the vehicle would involve inclining pad 6 in the same direction as pad 10, while pads 4 and 8 were oppositely inclined. In order to reverse the direction of the vehicle, it is only necessary to reverse the direction of rotation of drive axle 34, or alternatively reverse inclinations of pads 4, 8 and 6, 10 by control rods 64. In addition to direct forward and rearward movement of the vehicle in the manner described, it will be evident that differential inclinations of the individual pads will produce a wide variety of dirigible movements of the vehicle. However, in all cases, there is achieved a balance between floatation as a result of the air bearing and frictional engagement for tractive effort as a result of positive engagement of rib segments on the ground. Naturally, greater floatation requires less frictional engagement. However, in those cases where extremely irregular terrain might tend to diminish the floatation effect, it naturally follows that the degree of tractive effort will increase correspondingly.

To arrest rotational movement of disk 28, platform 22 is provided with pairs of hydraulically displaceable friction shoes 66 which are forced into engagement with disk 28 by hydraulic pressure introduced through conduits 68 in a conventional manner.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a motor vehicle, a supported superstructure, a plurality of pressurized air conducting hollow depending pillars connected to said superstructure, a generally horizontal circular platform articulatably mounted at the lower end of each pillar, a ground proximate circular disk abutting the lower surface of each platform, drive means extending through said pillar for rotating said disks relative to said platforms, each disk having openings therein for transmitting superatmospheric air from said pillars into the space between said disk and the ground to form a low pressure air bearing supporting the vehicle in semi-frictionless relation to the ground, remotely operable means connected to said articulatably mounted platform for inclining the plane of rotation of said disks, an annular flexible diaphragm connected at its outer and inner periphery to the lower surface of each disk forming a downwardly bulged annular cavity, means for establishing and maintaining uniform air pressure in the interior of said cavity and the space surrounded thereby, said diaphragm surface being deformable against said air pressure to maintain a uniform circumferential vertical clearance gap with the ground irrespective of the angular inclination of said disk, and traction means formed peripherally on said diaphragm.

2. The structure set forth in claim 1 wherein said traction means comprises circumferentially spaced integral ribs extending radially inwardly from the outer periphery of said diaphragm less than half the distance from the outer to inner periphery thereof.

3. The structure set forth in claim 1 wherein said means for establishing and maintaining communication between the interior of said cavity and the space surrounded thereby comprises an opening formed in said diaphragm adjacent the inner peripheral connection thereof to said disk.

References Cited by the Examiner

UNITED STATES PATENTS

| | | | |
|---|---|---|---|
| 2,488,310 | 11/1949 | Mayer | 115—19 |
| 3,052,483 | 9/1962 | Petersen | 180—7 |
| 3,097,718 | 7/1963 | Jay et al. | 180—7 |
| 3,161,247 | 12/1964 | Mackie | 180—7 |
| 3,168,155 | 2/1965 | Cockerell | 180—7 |

FOREIGN PATENTS

| | | |
|---|---|---|
| 512,471 | 2/1954 | Belgium. |
| 1,278,912 | 11/1961. | France. |
| 878,818 | 10/1961 | Great Britain. |

A. HARRY LEVY, *Primary Examiner.*